(12) United States Patent
Yang et al.

(10) Patent No.: US 12,704,606 B2
(45) Date of Patent: Aug. 11, 2026

(54) SCANNING MODULE, DISTANCE MEASURING DEVICE, AND MOVABLE PLATFORM

(71) Applicant: SZ DJI TECHNOLOGY CO., LTD., Shenzhen (CN)

(72) Inventors: Yang Yang, Shenzhen (CN); Zezheng Zhang, Shenzhen (CN); Yihua Gan, Shenzhen (CN); Xin Sun, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 277 days.

(21) Appl. No.: 18/369,271

(22) Filed: Sep. 18, 2023

(65) Prior Publication Data

US 2024/0004040 A1 Jan. 4, 2024

Related U.S. Application Data

(63) Continuation of application No. PCT/CN2021/080955, filed on Mar. 16, 2021.

(51) Int. Cl.

*G01S 7/481* (2006.01)
*G02B 26/10* (2006.01)
*G01S 7/483* (2006.01)

(52) U.S. Cl.

CPC .......... *G01S 7/4817* (2013.01); *G02B 26/108* (2013.01); *G01S 7/483* (2013.01)

(58) Field of Classification Search

CPC ...... G01S 7/4817; G01S 7/483; G02B 26/108

(Continued)

(56) References Cited

U.S. PATENT DOCUMENTS 11,221,212 B2 * 1/2022 Huang .................... G01B 7/30
2005/0168720 A1 * 8/2005 Yamashita ............ G01S 7/4817 356/5.01

(Continued)

FOREIGN PATENT DOCUMENTS

CN 206400103 U 8/2017
CN 108496298 A 9/2018

(Continued)

OTHER PUBLICATIONS

International Search Report and Written Opinion mailed on Dec. 29, 2021, received for PCT Application PCT/CN2021/080955, filed on Mar. 16, 2021, 10 pages including English Translation.

*Primary Examiner* — Steven S Paik

(74) *Attorney, Agent, or Firm* — ANOVA LAW GROUP, PLLC

(57) ABSTRACT

A scanning module may include a main body holder having an accommodation cavity; a first optical assembly within the accommodation cavity and rotatably attached to the main body holder; a first drive assembly connected to the first optical assembly and the main body holder, respectively, and being configured to drive the first optical assembly to rotate relative to the main body holder; a second optical assembly rotatably disposed at one end of the main body holder; and a second drive assembly on a side of the second optical assembly facing the main body holder and connected to the second optical assembly and the main body holder, respectively, and configured to drive the second optical assembly to rotate relative to the main body holder.

19 Claims, 6 Drawing Sheets

(58) Field of Classification Search
USPC ........................................................ 359/201.1
See application file for complete search history.

(56) References Cited

U.S. PATENT DOCUMENTS

| | | | | |
|---|---|---|---|---|
| 2009/0041070 | A1 | 2/2009 | Yamagishi | |
| 2011/0235018 | A1* | 9/2011 | Mori | G01S 7/497<br>356/5.01 |
| 2014/0151535 | A1* | 6/2014 | Mori | G02B 26/101<br>359/200.7 |
| 2018/0275257 | A1* | 9/2018 | Kim | G01S 17/08 |
| 2019/0324122 | A1 | 10/2019 | Buehring | |

FOREIGN PATENT DOCUMENTS

| | | | | |
|---|---|---|---|---|
| CN | 109564345 | A | 4/2019 | |
| CN | 110045350 | A | 7/2019 | |
| CN | 209728159 | U | 12/2019 | |
| CN | 209878990 | U * | 12/2019 | |
| CN | 210199305 | U | 3/2020 | |
| CN | 211505892 | U | 9/2020 | |
| CN | 111868551 | A | 10/2020 | |
| EP | 1054232 | A2 * | 11/2000 | G01C 15/002 |

* cited by examiner

SCANNING MODULE, DISTANCE MEASURING DEVICE, AND MOVABLE PLATFORM

CROSS-REFERENCE TO RELATED APPLICATION

The present application is a continuation of International Application No. PCT/CN2021/080955, filed Mar. 16, 2021, the entire contents of which being incorporated herein by reference in its entirety.

TECHNICAL FIELD

The present application relates to the field of scanning technology and, in particular, to a scanning module, a distance measuring device and a movable platform.

BACKGROUND

In the traditional 360° rotating mirror type LIDAR scheme, the optical system is usually composed of an upper prism and a lower prism, and the two prisms rotate independently according to the specified rotational speed and direction, respectively.

However, the existing 360° rotating mirror lidar often has different degrees of scanning blind spots when performing scanning operations, and there is a problem that it cannot cover the full 360° scanning.

SUMMARY

In view of the above problems, the present application is proposed in order to provide a scanning module, a distance measuring device and a movable platform that solve the above or other problems.

In one embodiment of the present application, there is provided a scanning module.

The scanning module may include a main body holder having an accommodation cavity; a first optical assembly within the accommodation cavity and rotatably attached to the main body holder; a first drive assembly connected to the first optical assembly and the main body holder, respectively, and being configured to drive the first optical assembly to rotate relative to the main body holder; a second optical assembly rotatably disposed at one end of the main body holder; and a second drive assembly on a side of the second optical assembly facing the main body holder and connected to the second optical assembly and the main body holder, respectively, and configured to drive the second optical assembly to rotate relative to the main body holder.

Another embodiment of the present application also provides a distance measuring device comprising:

- the scanning module of one embodiment of the present application; and
- a distance measuring structure to transmit a light pulse sequence to the scanning module to change the transmission direction of the light pulse sequence and then emit it, the light pulse sequence reflected back by an ambient target passing through the scanning module and then incident to the distance measuring structure to determine a distance between the ambient target and the distance measuring device based on the reflected back light pulse sequence.

Another embodiment of the present application also provides a removable platform comprising:

- a movable platform body; and
- the distance measuring device of one embodiment of the present application; the distance measuring device being mounted on the movable platform body.

Some embodiments of the present application provide a technical solution in which both the first drive assembly and the second drive assembly are provided in a side area of the second optical component, thereby avoiding the cables of the first drive assembly and the second drive assembly from blocking the light-through path of the second optical component, reducing the working blind area of the scanning module, and thereby realizing full-angle coverage of the scanning area.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
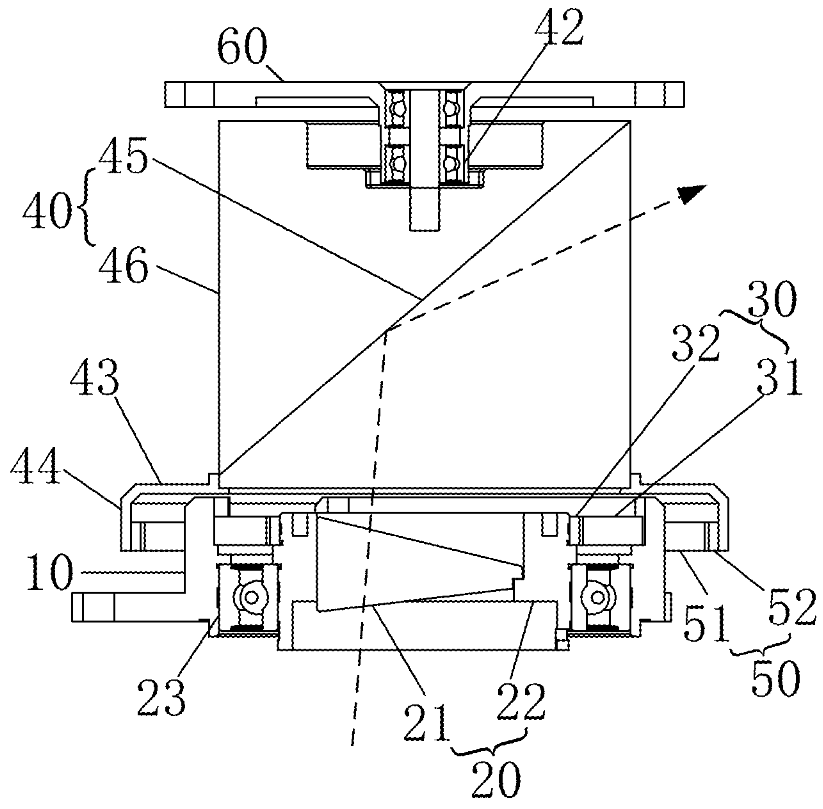
FIG. 1 is a schematic diagram of a sectional structure of a scanning module provided in an embodiment of the present application.

In order to enable those in the art to better understand embodiments of the present application, the technical solutions in the embodiments of the present application will be described below in conjunction with the accompanying drawings in the embodiments of the present application. Obviously, the described embodiments are a part of the embodiments of the present application and not all of the embodiments. Based on the embodiments in this application, all other embodiments obtained by a person of ordinary skill in the art without making creative labor fall within the scope of protection of this application.

It should be noted that in the description of the present application, the terms "first" and "second" are used only for the convenience of describing different components, and are not to be construed as indicating or implying a sequential relationship, a relative importance, or an implicit indication of the number of technical features indicated. Thus, a feature defined with the terms "first" and "second" may explicitly or implicitly include at least one such feature.

Unless otherwise defined, all technical and scientific terms used herein have the same meaning as commonly understood by those skilled in the art belonging to this application. The terms used herein in the specification of this application are used only for the purpose of describing specific embodiments and are not intended to limit this application.

In practicing some embodiments of the present application, the applicant has found that, in the traditional 360° rotating mirror type LiDAR solution, in order to realize that the two optical elements in the upper and lower orientations rotate independently according to the specified rotational speeds and direction respectively, two motors are usually used to drive the two optical elements respectively. The driving motor of the upper optical element is—usually set in the upper position of the upper optical element and connected to the main control circuit board located below the radar using a power signal line, so as to provide power for the upper optical element and feedback motor signals to the main control circuit board.

In order to realize the connection of the power signal line, the power signal line needs to be routed from top to bottom. However, through this routing method, the power signal line will pass through an optical path of the upper optical element, i.e., through an effective optical aperture of the radar. Therefore, it is inevitable that the power signal line will block the optical path at a certain angle, which leads to the radar having a blind spot at the certain angle. Accordingly, the radar is not able to achieve the 360° scanning of full Coverage.

In response to the above problem or other problems, one of the embodiments of the present application provides a scanning module, as well as a distance measuring device and a movable platform applying the scanning module, which can prevent cables from blocking a part of a through-lighting path of the upper optical component, thereby reducing a working blind spot of the scanning module and realizing full-angle coverage of the scanning area.

The technical solutions in some embodiments of the present application will be described below in conjunction with the accompanying drawings in the embodiments of the present application. The following embodiments and the features in the embodiments may be combined with each other without conflict. Obviously, the described embodiments are only a part of the embodiments of the present application, and not all of the embodiments. Based on the embodiments in this application, all other embodiments obtained by a person skilled in the art without making creative labor fall within the scope of protection of this application.

Example 1

FIG. 1 is a schematic diagram of a sectional structure of a scanning module provided in an embodiment of the present application, see shown in FIG. 1.

In one embodiment of the present application, there is provided a scanning module comprising: a main body holder 10, a first optical assembly 20, a first drive assembly 30, a second optical assembly 40, and a second drive assembly 50.

In one embodiment, the main body holder 10 has an accommodation cavity. The first optical assembly 20 is disposed in the accommodation cavity and is rotatably coupled to the main body holder 10. A first drive assembly 30 is connected to the first optical assembly 20 and the main body holder 10, respectively, and is capable of driving the first optical assembly 20 to rotate relative to the main body holder 10. The second optical assembly 40 is rotatably provided at one end of the main body holder 10. There is a light passage between the second optical assembly 40 and the first optical assembly 20. A second drive assembly 50 is disposed on the side of the second optical assembly 40 facing the main body holder 10 and is connected to the second optical assembly 40 and the main body holder 10, respectively, and is capable of driving the second optical assembly 40 to rotate relative to the main body holder 10.

The first optical assembly 20, the first drive assembly 30, the second optical assembly and the second drive assembly 50 are all set up based on the main body holder 10, which provides support for the first optical assembly 20, the first drive assembly 30, and the second drive assembly 50, and in some embodiments of the present application, the main body holder 10 also provides support for the second optical assembly 40, which will be described in detail in the subsequent contents, will not be described in detail herein.

In the technical solution provided by some embodiments of the present application, taking the orientation in FIG. 1 as an example, the second optical assembly 40 and the first optical assembly 20 are set up along the top and bottom orientation, the first drive assembly 30 and the second drive assembly 50 are set up on one side of the second optical assembly 40, and the cables of the first drive assembly 30 and the second drive assembly 50 can be connected to the main control system located underneath the main body holder 10, thereby providing power for the first drive assembly 30 and the second drive assembly 50 and feeding motor signals back to the main control system. Compared to the traditional solution in which the power signal lines need to be routed from top to bottom, in some embodiments of the present application, the cables of the first drive assembly 30 and the second drive assembly 50 are routed from the bottom, and the cables of the first drive assembly 30 and the second drive assembly 50 do not need to be routed from above the second optical component 40 to supply power and transmit signals, and thus the cables do not need to pass through the light-through path of the second optical component 40. Therefore, the cables do not need to pass through the light path of the second optical component 40, thereby not blocking the light path of the second optical component 40, reducing the working blind spot of the scanning module, and thereby realizing full-angle coverage of the scanning area.

The technical solutions provided by some embodiments of the present application are described in detail below.

The scanning module provided in some embodiments of the present application can be applied to a distance measuring device or a distance measurer, the distance measuring device includes a scanning module or structure and a distance measuring module or structure, the distance measuring module is used to transmit an optical pulse sequence to the scanning module, the scanning module is used to change the transmission direction of the optical pulse sequence and then emit it, the optical pulse sequence emitted back by a detected object passes through the scanning module and then is incident to the distance measuring module. The distance measuring module is used to determine the distance between the detected object and the distance measuring device based on the reflected optical pulse sequence. The distance measuring device is used to sense information of an external ambient target, which may also be referred to as information of the detected object, such as distance information, orientation information, reflection intensity information, speed information, etc., of the ambient target (the detected object). In one embodiment, the distance measuring device may detect a distance from the ambient target to the distance measuring device by measuring the time of light propagation between the distance measuring device and the ambient target, i.e., Time-of-Flight (TOF). Alternatively, the distance measuring device may detect the distance from the ambient target to the distance measuring device by other techniques, such as distance measuring methods based on phase shift measurements, or distance measuring methods based on frequency shift measurements, without limitation herein.

In one embodiment, in conjunction with FIG. 1, one workflow of the distance measuring device for distance measuring is as follows:

The distance measuring module may emit an optical pulse sequence (e.g., a laser pulse sequence), and the optical pulse sequence passes through the first optical component 20 and the second optical component 40 in the scanning module, and is emitted to the external environment after changing the transmission direction, and the dotted line in FIG. 1 is a part of the emitted running route of the optical pulse sequence.

The light pulse sequence encounters the ambient target and is reflected, and the reflected light pulse sequence is incident to the distance measuring module after passing through the scanning module, and the distance measuring module receives the light pulse sequence that has been reflected by the ambient target, and carries out photoelectric conversion of the light pulse sequence to obtain an electrical signal. Then, the distance measuring module processes the electrical signal and then undergoes sampling, arithmetic operations, and so on, so as to determine the distance between the distance measuring device and the ambient target.

Further, the distance measuring device in some embodiments of the present application may be applied to a movable platform, and the distance measuring device may be mounted on a movable platform body of the movable platform. The movable platform having the distance measuring device may perform measurements of the external environment, for example, measuring a distance between the movable platform and an obstacle for purposes such as obstacle avoidance, and two- or three-dimensional mapping of the external environment. In some embodiments of the present application, the movable platform comprises at least one of an unmanned aerial vehicle, an automobile, a remotely controlled vehicle, a robot, or a camera.

It should be noted that in the above embodiments and the following embodiments, for example, in the orientation in FIG. 1, a radial direction of the accommodation cavity refers to the left-right direction in FIG. 1, which may also be referred to as the width direction of the scanning module, and accordingly, the axial direction of the accommodation cavity refers to the up-down direction in FIG. 1, which may also be referred to as the length or height direction of the scanning module.

Figure 2:
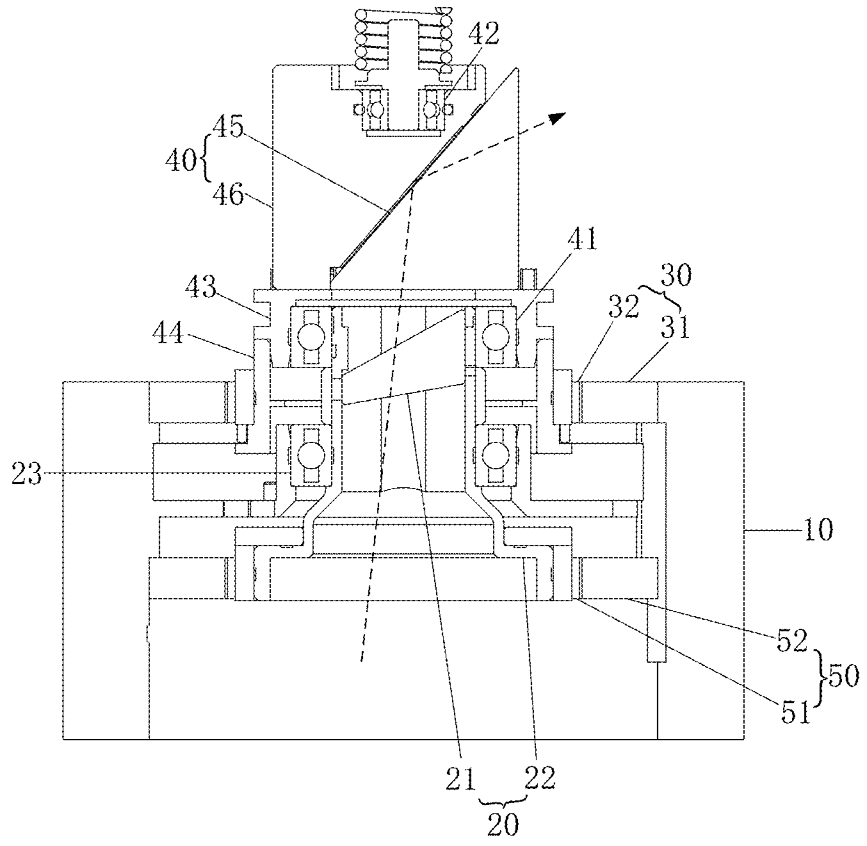
FIG. 2 shows a schematic diagram of a cross-sectional structure of a scanning nodule provided in an embodiment of the present application.

Continuing to refer to FIGS. 1 and 2, in one embodiment of the present application, one way in which the first drive assembly 30 may be realized is that the first drive assembly 30 comprises a first induction coil 31 and a first induction magnet 32. One of the first induction coil 31 or the first induction magnet 32 is coupled to the main body holder 10, and the other is coupled to the first optical assembly 20. The first induction coil 31 and the first induction magnet 32 may both be annular in shape and correspondingly annularly disposed on a circumferential exterior of the first optical assembly 20. The first induction coil 31 may be powered via a cable, and the first induction coil 31 may be energized to generate a rotating magnetic field and act on the first induction magnet. 32 to form a magneto-electric powered rotational torque, and thus rotation occurs. By way of example, fixing the first induction coil 31 to the main body holder 10 allows the first induction coil 31 to be used as a stator. Fixing the first induction magnet 32 to the first optical assembly 20 may use the first induction magnet 32 as a rotor. The first induction coil 31 corresponds concentrically with the first induction magnet 32, and when the first induction coil 31 is energized, an induced magnetic field is generated so that the first induction magnet 32 can be driven to rotate with respect to the first induction coil 31. Then, the first induction magnet 32 drives the first optical assembly 20 to rotate with respect to the main body holder 10. Further, parameters such as the amount of energization, the rotational speed and the rotational direction of the first optical assembly 20 can be changed, thereby changing a transmission angle of the light pulse sequence through the first optical assembly 20.

According to different needs, the relative positions of the first induction coil 31 and the first induction magnet 32 may be arranged in various ways. Referring to FIGS. 1 and 2, one realizable way is that the first induction coil 31 and the first induction magnet 32 are concentrically disposed and distributed along a radial direction of the accommodating cavity, i.e., one of the first induction coil 31 or the first induction magnet 32 is looped around the outside of the other one along the radial direction of the accommodation cavity. For example, one realizable way is that, referring to the illustrations in FIGS. 1 and 2, a diameter of the first induction coil 31 is larger than a diameter of the first induction magnet 32, and the first induction coil 31 is looped around the outside of the other one. But, of course, it is possible that the first induction magnet 32 can be looped on the outside of the first induction coil 31. In this setting, the drive assembly comprising the first induction coil 31 and the first induction magnet 32 can be called a radial motor, and the first induction coil 31 and the first induction magnet 32 occupy space along the width direction of the scanning module, thereby reducing the space occupied in the height direction of the scanning module, and reducing the overall height of the scanning module.

Another way of arranging the position of the first induction coil 31 and the first induction magnet 32 is that the first induction coil 31 and the first induction magnet 32 are distributed along the axial direction of the accommodating cavity. In the manner in which the first induction coil 31 and the first induction magnet 32 are arranged along the axial direction, the drive assembly comprising the first induction coil 31 and the first induction magnet 32 may be referred to as an axial motor, and the first induction coil 31 and the first induction magnet 32 occupy a space along the height direction of the scanning module, thereby reducing the space occupied in the width direction of the scanning module, and the overall width of the scanning module may be reduced. When the first induction coil 31 and the first induction magnet 32 are distributed along the axial direction of the accommodating cavity, the first induction coil 31 and the first induction magnet 32 may also be concentrically disposed in the same direction.

Figure 3:
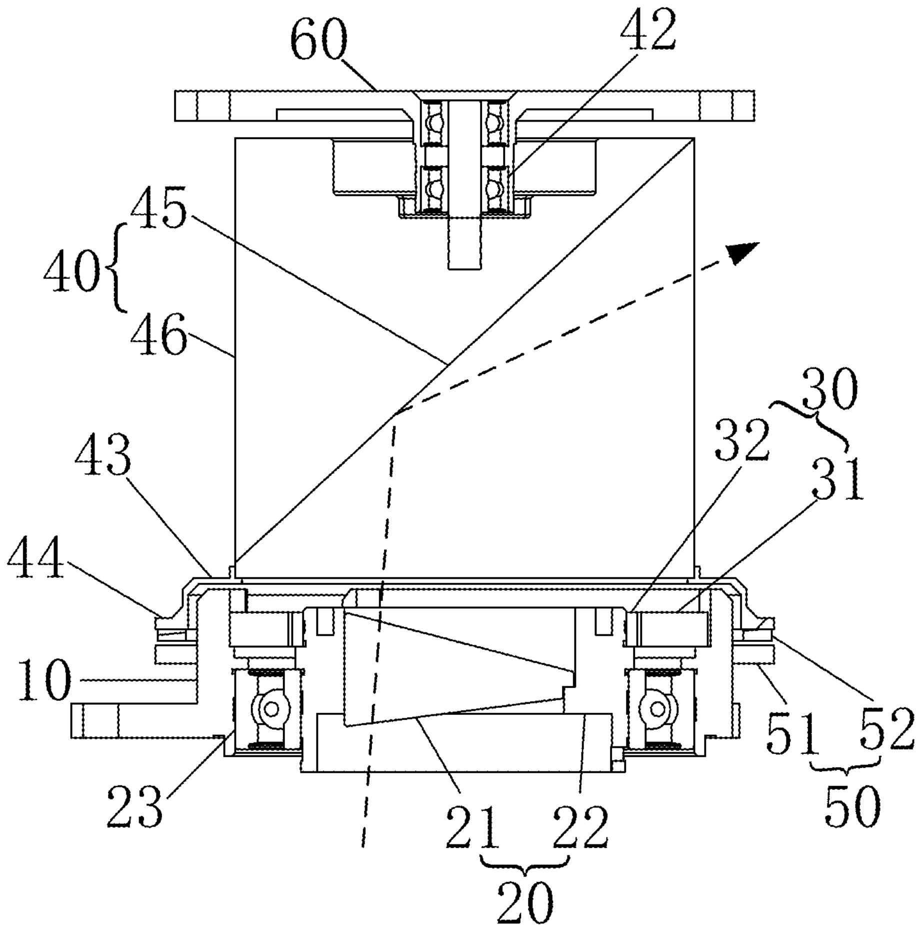
FIG. 3 shows a schematic diagram of a sectional structure of a scanning module provided in an embodiment of the present application.

Referring to FIGS. 1 to 3, in an embodiment of the present application, one way in which the first optical assembly 20 may be realized is that the first optical assembly 20 comprises a first optical element 21 and an adapter 22, the adapter 22 having a light-transmitting channel. The first optical element 21 is fixedly disposed in the light-transmitting channel. The adapter 22 is connected to the first drive assembly 30 and the main body holder 10, respectively. The adapter 22 is used to provide support for the first optical element 21, and the first optical element 21 and the adapter 22 may be fixedly connected, or may also be removably connected, so as to allow for replacement of a different first optical element 21. A light pulse sequence is incident on the first optical element 21 along the light-transmitting channel, and then after passing through the first optical element 21, is incident on the second optical element 40. The adapter 22 is also used to connect with the first drive assembly 30. The first drive assembly 30 can drive the adapter 22 to rotate relative to the main body holder 10, and when the adapter 22 rotates, it drives the first optical element 21 to rotate synchronously.

In one embodiment, in order to make the rotation between the adapter 22 and the main body holder 10 smoother, the adapter 22 is provided with at least one first bearing member or structure 23 at the outer periphery, and the adapter 22 is rotatably connected to the main body holder 10 via the first hearing member 23. In one embodiment, the first hearing member 23 includes an inner ring and an outer ring, the inner ring and the outer ring are provided with a rolling member or roller, the inner ring is connected to the outer wall of the adapter 22, and the outer ring is connected to the main body holder 10. When the adapter 22 rotates relative to the main body holder 10, the inner ring is driven to rotate relative to the outer ring, and the rolling member reduces the rotating friction, making the rotating action smoother. Hard friction between the adapter 22 and the main body holder 10 can be avoided by the first bearing member 23, which reduces the effect of friction on the rotating action, and reduces the chances of wear and tear of the adapter 22 and the main body holder 10.

In some embodiments of the present application, according to different needs, the first bearing member 23 may be one or a plurality, and when the first bearing member 23 is a plurality, the first bearing member 23 may be spaced apart along the height direction of the adapter on the adapter 22, so as to realize a multi-point contact between the adapter 22 and the main body holder 10, thereby making the adapter 22 smoother and more stable when performing the rotating action.

Further, the number of the first optical elements 21 may be one or more depending on different needs. The transmission direction of the optical pulse sequence can be changed once by one first optical element 21, and the transmission direction of the optical pulse sequence can be changed multiple times after a plurality of first optical elements 21. When the number of the first optical elements 21 is a plurality, the plurality of first optical elements 21 may be spaced apart along the axial direction of the accommodation cavity. The plurality of first optical elements 21 are spaced apart on the optical path of the optical pulse sequence, so that the optical pulse sequence can pass through the plurality of first optical elements 21 in sequence before being incident to the second optical component 40.

In some embodiments of the present application, the first optical element 21 includes, but is not limited to, a prism for refracting light. For example, the first optical element 21 may be one of a triangular prism, a trapezoidal prism, a pentagonal prism, and of course other types of prisms that can refract light. After the light pulse sequence is incident on the first optical element 21, it is refracted thereby changing the direction of transmission of the light pulse sequence.

In some embodiments of the present application, the manner in which the second optical assembly 40 is arranged with the main body holder 10 may be realized in a variety of ways, depending on different needs. Referring to FIGS. 1 and 3, one realizable way is that the second optical assembly 40 is rotatably suspended at one end of the main body holder 10. In this way of arrangement, there is no contact between the second optical assembly 40 and the main body holder 10, and there is no friction between the second optical assembly 40 and the main body holder 10 when the second optical assembly 40 is rotated. The second optical assembly 40 may cover one end of the accommodation cavity, thereby forming a light-through channel with the first optical assembly 20, Referring to FIGS. 1 and 3, the end of the second optical assembly 40 facing the main body holder 10 may be partially annularly disposed with the circumferential periphery of the main body holder 10, and connected to the second drive assembly 50 through the annularly disposed portion. Alternatively, one end of the second optical assembly 40 toward the main body holder 10 may be partially extended into the accommodation cavity and the accommodation cavity looped around the circumferential periphery of the first optical assembly connected to the second drive assembly 50 by the extended portion. Alternatively, the second optical assembly 40 is coupled to the second drive assembly 50 by an end face toward one end of the main body holder 10, and the main body holder 10 is coupled to the second drive assembly by an end face or an outer face toward one end of the second optical assembly 40.

In one embodiment, the second optical assembly 40 is rotatably connected to a fixed component by an end away from the main body holder 10. The fixed component serves to provide support for the second optical assembly 40 so that the second optical assembly 40 can be suspended from the fixed component, thereby realizing a suspended setting of the second optical assembly 40 with respect to the main body holder 10, or so that a support force is provided at each end of the second optical assembly 40 to improve the rotational stability of the second, optical assembly 40. One way in which the fixing component may be realized is that, referring to FIGS. 1 and 3, the scanning module further comprises a housing 60 (only a portion of the housing 60 is shown in FIGS. 1 and 3). Both the main body holder 10 and the second optical assembly 40 are located within the housing 60. The second optical assembly 40 is rotatably coupled to the housing 60 by an end away from the main body holder 10, which allows the second optical assembly 40 to be suspended by the support provided by the housing 60. In this embodiment of the present application, the portion of the housing 60 illustrated in FIGS. 1 and 3 may be defined as a top plate, and in addition to the top plate illustrated in FIGS. 1 and 3, the housing 60 includes sidewalls annularly disposed around the periphery of the scanning module, and at least the sidewalls on the housing 60 are of a transparent structure in order not to block the path of through light. The housing 60 is hooded and fastened to the exterior of the scanning module, providing protection for the scanning module through the top plate and the side walls, and at the same time, providing support for the second optical assembly 40 through the top plate. The side walls may be transparent structures, which will not affect the light-through paths of the scanning module, and reduce the working blind zones of the scanning module, so as to realize the full-angle coverage of the scanning area.

Referring to FIG. 2, another arrangement of the second optical assembly 40 with the main body holder 10 is that the end of the second optical assembly 40 facing the main body holder 10 is provided with a second bearing member or structure 41, and the second optical assembly 40 is pivotally coupled to the first optical assembly 20 or the main body holder 10 via the second bearing member 41. The end of the second optical assembly 40 facing the main body holder 10 partially extends into the accommodation cavity and is partially looped around the circumferential periphery of the first optical assembly 20, and is connected to the second drive assembly 50 through the extended portion, and at the same time, is connected to the second bearing member 41 through the extended portion.

One way in which the second bearing member 41 may be realized is that the second bearing member 41 comprises an inner ring and an outer ring, and a rolling member or roller between the inner ring and the outer ring. One way of connecting the second bearing member 41 is that, referring to FIG. 2, the inner ring is connected to the outer wall of the adapter 22 on the first optical assembly 20, and the outer ring is connected to an extended portion of the second optical assembly 40, and the second optical assembly 40 is rotatably connected to the first optical assembly 20 by the second bearing member 41. When the second optical assembly 40 rotates relative to the first optical assembly 20, the outer ring is driven to rotate relative to the inner ring, and the rotating friction is reduced by the rolling member, making the rotating action smoother. The hard friction between the first optical assembly 20 and the second optical assembly 40 can be avoided by the second bearing member 41, which reduces the effect of friction on the rotating action, and reduces the chances of wear and tear of the first optical assembly 20 and the second optical assembly 40.

Another embodiment of connecting the second bearing member 41 is that the inner ring is connected to the portion of the second optical assembly 40 that extends into the accommodation cavity, and the outer ring is connected to the main body holder 10, and the second optical assembly 40 is rotatably connected to the main body holder 10 by the second bearing member 41. When the second optical assembly 40 is rotated relative to the main body holder 10, the inner ring is driven to rotate relative to the outer ring, and the rotational friction is reduced by the rolling member, which makes the rotational action smoother. Hard friction between the second optical assembly 40 and the main body holder 10 can be avoided by the second bearing member 41, which reduces the effect of friction on the rotating action and reduces the chance of wear and tear of the second optical assembly 40 and the main body holder 10.

Further, in the manner in which the second optical assembly 40 is rotatably coupled to the first optical assembly 20 or the main body holder 10, in order to improve the smoothness of rotation of the second optical assembly 40, the end of the second optical assembly 40 that is away from the main body holder 10 may also be rotatably coupled to a certain stationary component, such as being rotatably coupled to the housing 60.

In one embodiment, in order to make the rotation between the second optical assembly 40 and the housing 60 smoother, referring to FIGS. 1 to 3, the second optical assembly 40 is provided with at least one third bearing member or structure 42 at an end of the second optical assembly 40 away from the main body holder 10, and the second optical assembly 40 is rotatably disposed at the end of the main body holder 10 via the third bearing member 42. In one embodiment, the third bearing member 42 comprises an inner ring and an outer ring, and a rolling member or roller is provided between the inner ring and the outer ring. The housing 60 extends an adapter shaft in the direction where the second optical component 40 is located, the adapter shaft is socketed to the inner ring of the third bearing member 42, and the outer ring of the third bearing member 42 is connected to the second optical component 40, so that when the second optical component 40 rotates with respect to the housing 60, the outer ring is driven to rotate with respect to the inner ring, which reduces the friction of rotation through the rolling member, and makes the rotating action smoother. To make the rotation smoother, the third bearing member 42 may be a plurality, and the plurality of third bearing members may be spaced apart along the height direction of the scanning module.

Another achievable way is that the housing 60 is provided with a fourth bearing member or structure, the second optical assembly 40 is provided with an adapter shaft, the adapter shaft is socketed to the inner ring of the fourth bearing member, and the outer ring of the third bearing member 42 is connected to the housing 60, and when the second optical assembly 40 rotates with respect to the housing 60, it drives the inner ring to rotate with respect to the outer ring, and the rotational friction is reduced by the rolling member to make the rotational action smoother.

Referring to FIGS. 1 to 3, one way in which the second optical assembly 40 may be realized in one embodiment of the present application is that the second optical assembly 40 is provided with a connecting bracket 43 at one end of the second optical assembly 40 toward the main body holder 10. The second optical assembly 40 is connected to the second drive assembly via the connecting bracket 43. With the second optical assembly 40 rotatable on the first optical assembly 20 or the main body holder 10, the second optical assembly 40 is connected to the second bearing member 41 via the connection bracket 43.

In one embodiment, one way in which the second drive assembly 50 may be realized is that the second drive assembly 50 includes a second magnetic induction coil 51 and a second induction magnet 52, one of the second magnetic induction coil 51 or the second induction magnet 52 being coupled to the main body holder 10 and the other being coupled to the connection bracket 43. The second magnetic sense coil 51 and the second induction magnet 52 may both be annular in shape and correspondingly annularly disposed around a circumferential periphery of the main body holder 10 or a circumferential exterior of the second optical assembly 40. The second magnetic sense coil 51 may be powered via a cable, and the second magnetic sense coil 51 may be energized to generate a rotating magnetic field and act on the second induction magnet 52 to form a magneto-electric powered rotational torque so that rotation occurs. By way of example, fixing the second magnetic sense coil 51 to the main body holder 10 allows the second magnetic sense coil 51 to be used as a stator. Fixing the second induction magnet 52 to the connection bracket 43 allows the second induction magnet 52 to act as a rotor. The second induction coil 51 corresponds concentrically with the second induction magnet 52, and when the second magnetic induction coil 51 is energized, an induced magnetic field is generated, so that the second induction magnet 52 can be driven to rotate with respect to the second induction coil, and the second induction magnet 52 drives the connection bracket 43 to rotate, i.e., to drive the second optical assembly 40 to rotate with respect to the main body holder 10. Further, the amount of energization, the rotational speed and rotational direction of the second optical assembly 40 can be changed, thereby changing the transmission angle of the light pulse sequence through the second optical assembly 40.

In one embodiment, the relative positions of the first drive assembly 30 and the second drive assembly 50 may be arranged in various ways according to different needs. Referring to FIG. 1, one realizable way is that the second magnetic induction coil 51 and the second induction magnet 52 are both annularly disposed around the periphery of the first drive assembly 30 in the radial direction of the storage cavity, or that the first drive assembly 30 is disposed within the annulus of the second magnetic induction coil 51 and the second induction magnet 52 in the radial direction of the storage cavity. In this setting, the first drive assembly 30 and the second drive assembly 50 occupy space along the width direction of the scanning module, thereby reducing the space occupied in the height direction of the scanning module, and the overall height of the scanning module can be reduced, accordingly, when the scanning module is applied to the distance measuring or distance measuring device, the overall height of the distance measuring device can be effectively reduced, and it is convenient to apply the distance measuring device to the installation area that has high requirements for height.

Referring to FIG. 2, another arrangement of the position of the first drive assembly 30 and the second drive assembly 50 is that the first drive assembly 30 and the second drive assembly 50 are spaced apart along the axial direction of the accommodation cavity. Taking the orientation in FIG. 1 as an example, the axial direction of the accommodation cavity refers to the up and down direction in FIG. 1, which may also be referred to as the length or height direction of the scanning module. In this setting method, the first drive assembly 30 and the second drive assembly 50 occupy space along the height direction, thereby reducing the space occupied in the width direction of the scanning module, and the overall width of the scanning module can be reduced, and accordingly, when the scanning module is applied to the distance measuring device, the overall width of the rangefinder device can be effectively reduced, and it is convenient to apply the rangefinder device to an installation area that has high requirements for width.

In order to further reduce the occupied space along the width direction, the first drive assembly 30 and the second drive assembly 50 may be set up correspondingly along the axial direction of the cavity, such as arranged vertically along the axial direction, and in this setup, the overall widths of the first drive assembly 30 and the second drive assembly 50 are smaller, which may reduce the overall width of the scanning module.

According to different needs, the relative positions of the second magnetic induction coil 51 and the second induction magnet 52 may be arranged in various ways. Referring to FIGS. 1 and 2, one realizable way is that the second magnetic induction coil 51 and the second induction magnet 52 are concentrically disposed and distributed in a radial direction along accommodation cavity, i.e., one of the second induction coil 51 or the second induction magnet 52, ring-set on the outside of the other, along the radial direction of the accommodation cavity, e.g., one realizable way is that, referring to the illustrations shown in FIGS. 1 and 2, a diameter of the second induction coil 51 is larger than a diameter of the second induction magnet 52, and the second induction coil 51 is looped on the outside of the second induction magnet 52, or of course, the second induction magnet 52 may also be looped on the outside of the second induction coil 51. In this setting, the drive assembly comprising the second induction coil 51 and the second induction magnet 52 can be called a radial motor, and the second induction coil and the second induction magnet 52 occupy space along the width direction of the scanning module, thereby reducing the space occupied in the height direction of the scanning module, and the overall height of the scanning module can be reduced.

Referring to FIG. 3, another arrangement of the position of the second induction coil and the second induction magnet 52 is that the second magnetic induction coil 51 and the second induction magnet 52 are distributed along the axial direction of the accommodation cavity. The second drive assembly 50 is arranged in the axial direction in such a way that the drive assembly comprising the second induction coil and the second induction magnet 52 may be referred to as an axial motor, and the second induction coil and the second induction magnet 52 occupy a space along the height direction of the scanning module, thereby reducing the space occupied in the width direction of the scanning module, and the overall width of the scanning module may be reduced. Further, with reference to the manner in which the second induction coil 51 and the second induction magnet 52 are provided in the axial direction, the first induction coil 31 and the first induction magnet 32 may also be distributed along the axial direction of the accommodation cavity. Thereby, the space occupied in the width direction of the scanning module is further reduced, and the overall width of the scanning module can be reduced.

It should be noted that both the first drive assembly 30 and the second drive assembly 50 may be one of a radial motor or an axial motor, and in some embodiments of the present application, different types of drive assemblies may be selected according to different needs. For example, the first drive assembly 30 and the second drive assembly 50 may be radial motors or axial motors or one of the first drive assembly 30 or the second drive assembly 50 may be a, radial motor, and the other may be an axial motor, without specific limitation in the embodiments of the present application.

In one embodiment, to better realize the connection with the second drive assembly 50, continuing to refer to FIGS. 1 to 3, the connecting bracket 43 is provided with a connecting folded edge 44 on the circumferential periphery of the connecting bracket 43, the connecting folded edge 44 extends in the axial direction of the accommodation cavity, or extends in the radial direction of the accommodation cavity, One of the second magnetic induction coil 51 or the second induction magnet 52 is connected to the connecting folded edge 44. The connecting bracket 43 is connected to the second optical assembly 40 by its main body portion to carry the second optical assembly 40, and it is connected to the second drive assembly 50 by the connecting folded edge 44. When a second bearing member 41 is provided, the connecting bracket 43 is connected to the second bearing member 41 by the connecting folded edge 44.

Depending on the connection method, the extension direction of the connecting folded edge 44 may be different, e.g., refuting to FIG. 1, the connecting folded edge 44 is located outside the accommodation cavity and enclosed on the outer side of the main body holder 10. The connecting folded edge 44 extends along the axial direction of the accommodation cavity and is looped around the outer periphery of the main body holder 10, and is connected to the second drive assembly 50 through the connecting folded edge. In such an arrangement, the second drive assembly 50 may be a radial motor, and along the radial direction, the second inductor coil and the second inductor magnet 52 are connected to the main body holder 10 and the connecting folded edge 44, respectively.

In one embodiment, for example, see FIG. 2, the connecting folded edge 44 is located inside the accommodation cavity. The connecting folded edge 44 extends in the axial direction of the accommodation cavity and is looped around the periphery of the first optical component 20, and is connected to the second drive component 50 and the second bearing member 41 through the folded edge. In this setting, the second drive component 50 may be a radial motor, and along the radial direction, the second inductor coil and the second inductor magnet 52 are connected to the main body holder 10 and the connecting folded edge 44, respectively. Of course, when the connecting folded edge 44 is located inside the accommodation cavity, the connecting folded edge 44 may also extend in the radial direction of the housing cavity, and accordingly be connected to the second drive assembly 50.

In one embodiment, see FIG. 3, the connecting folded edge 44 is located outside of the accommodation cavity and surrounds the outer side of the main body holder 10. The connecting folded edge 44 extends in the radial direction of the accommodation cavity and is looped around the outer periphery of the main body seat 10, and is connected to the second drive assembly 50 through the folded edge. In this setup, the second drive assembly 50 may be an axial motor, and along the axial direction, the second inductor coil and the second inductor magnet 52 are connected to the main body holder 10 and the connecting folded edge 44, respectively.

It should be noted that the above-described examples are only a part of the examples of the embodiments of the present application, but not all of the examples, based on different needs, the connecting bracket 43 can also be realized in other ways to be connected with the second drive assembly 50 and the second bearing member 41, which will not be described herein in detail one by one.

Continuing to refer to FIGS. 1 to 3, in an embodiment of the present application, one way in which the second optical assembly 40 may be realized is that the second optical assembly 40 comprises a second optical element 45 and a counterweight member or structure 46. The counterweight member 46 has a connecting surface. The second optical element 45 is fixedly disposed on the connecting surface and corresponds in position to the first optical assembly 20. The second optical element 45 corresponds to the position of the first optical assembly 20), and the optical pulse sequence, after being ejected from the first optical assembly 20, is incident on the second optical element 45, and after being emitted by the second optical element 45, is ejected from the second optical element 45, thereby changing the transmission path of the optical pulse sequence.

In one embodiment, the counterweight member 46 is used to provide support for the second optical element 45, and the second optical element 45 and the counterweight member 46 may be fixedly connected, or may also be removably connected, so as to be capable of replacing a different second optical element 45. Meanwhile, the counterweight member 46 may be also used to be connected with other components to realize the connection of the second optical assembly 40, such as, for example, connecting with the housing 60 through the counterweight member 46, such as the third bearing member 42 is provided on the counterweight member 46, and the counterweight member 46 realizes the rotatable connection with the housing 60 through the third bearing member 42 cooperating with the adapter shaft. When the shape of the counterweight member 46 is consistent with the second optical element 45 and the weight of the counterweight member 46 and the second optical element 45 are consistent, the rotation axis of the second optical assembly 40 is consistent with the overall centerline of the second optical assembly 40. When the weight of the counterweight member 46 and the second optical element 45 are not consistent, for example, the weight of the counterweight member 46 is greater than the weight of the second optical element 45, in order to ensure the dynamic balance of the second optical assembly 40, the rotation axis of the second optical assembly 40 is offset from the overall centerline of the second optical assembly 40, which is conducive to improving the counterbalance of the second optical assembly 40, and when rotating, it can make the rotation of the second optical element 45 movement more smoothly, so that the change of the transmission path of the optical pulse sequence can be realized accurately.

In some embodiments of the present application, the second optical element 45 includes, but is not limited to, a prism for reflecting light. For example, the second optical element 45 may be a right-angle prism, but of course includes other types of prisms that can reflect light. After the light pulse sequence is incident on the second optical element 45, it is reflected thereby changing the direction of transmission of the light pulse sequence.

It is to be noted that the scanning module may include more than two drive assemblies to drive more than two optical elements, and in the case where the number of drive assemblies is more than two, the layout of these more than two drive assemblies may be in the manner of the layout of two drive assemblies as described above, such as, for example, a homogeneous axial layout, a homogeneous radial layout, and a combination of axial and radial layouts, and the optical elements are not sandwiched between the neighboring drive assemblies, in order to avoid blocking of the outgoing light path of the optical element by the alignment. Of course, it can be understood that the drive assembly A and the drive assembly B are adjacent to each other, but the fact that an optical element may be provided in the drive assembly A or the drive assembly B does not mean that the optical element is sandwiched between the drive assembly A and the drive assembly B.

Example 2

Some embodiments of the present application also provide a distance measuring device or distance measurer comprising: a scanning module described in Example 1, and a distance measuring module. The distance measuring module is used to transmit an optical pulse sequence to the scanning module, the scanning module is used to change the transmission direction of the optical pulse sequence and then emit it, the optical pulse sequence emitted back by the ambient target is incident to the distance measuring module after passing through the scanning module, and the distance measuring module is used to determine a distance between the ambient target and the distance measuring device based on the reflected back optical pulse sequence.

In one embodiment of the present application, the realization of the scanning module can be referred to and borrowed from the realization of the scanning module in Example 1, and will not be repeated herein.

For ease of understanding, the workflow of distance measuring will be described below by way of example in conjunction with the distance measuring device 100 shown in FIG. 4.

Figure 4:
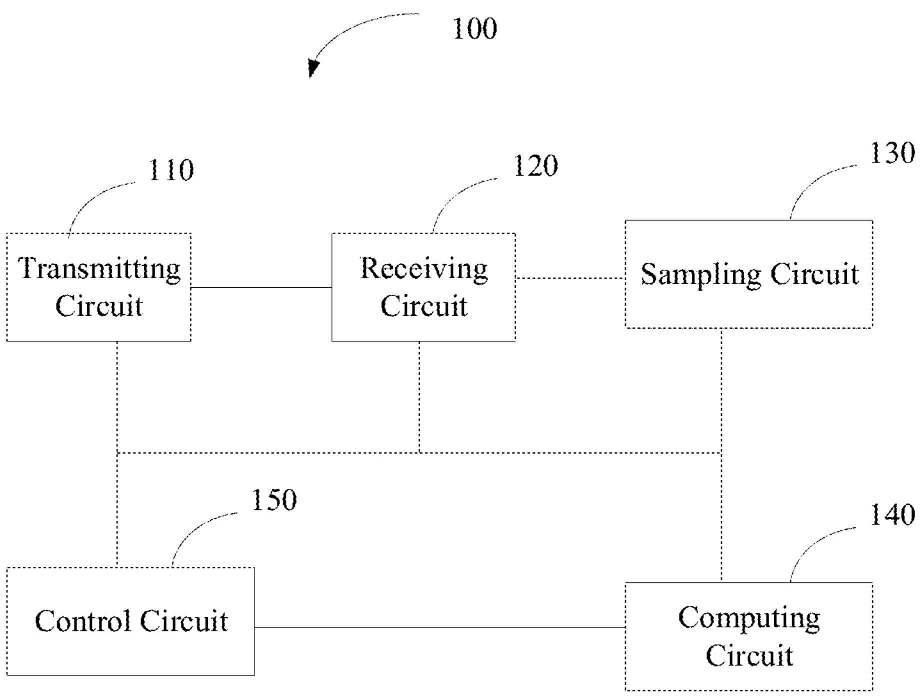
FIG. 4 shows a schematic diagram of a structure of a distance measuring device provided in an embodiment of the present application.

As shown in FIG. 4, the distance measuring device 100 may include a transmitting circuit 110, a receiving circuit 120, a sampling circuit 130, and a computing circuit 140.

The transmitting circuit 110 may transmit a sequence of light pulses (e.g., a laser pulse sequence). The receiving circuit 120 may receive the light pulse sequence reflected by the ambient target and perform photoelectric conversion of the light pulse sequence to obtain an electrical signal, which may be processed and output to the sampling circuit 130, which may sample the electrical signal to obtain a sampling result. The computing circuit 140 may determine a distance between the distance measuring device 100 and the ambient target based on the sampling results of the sampling circuit 130.

Further, the distance measuring device 100 may also include a control circuit 150 that may realize control of other circuits, for example, may control the operating time of individual circuits and/or set parameters for individual circuits, and the like.

It should be understood that although the distance measuring device 100 illustrated in FIG. 4 includes a transmitting circuit 110, a receiving circuit 120, a sampling circuit 130, and a computing circuit 140, for emitting a one-way beam for detection, the embodiments of the present application are not limited to this, and the number of circuits of any one of the transmitting circuit 110, the receiving circuit 120, the sampling circuit 130, and the computing circuit 140 may be at least two for ejecting at least two beams of light along the same direction or respectively along different directions. The at least two beams may be emitted at the same time or may be emitted separately at different moments. In one example, the light emitting chips in the at least two emitting circuits 110 are packaged in the same module. For example, each of the emitting circuits 110 includes a laser-emitting chip, and the dies in the laser-emitting chips of the at least two emitting circuits 110 are packaged together to be accommodated in the same packaging space.

In this regard, the module including the transmitting circuit 110, the receiving circuit 120, the sampling circuit 130, and the computing circuit 140 may be referred to as a distance measuring module or, alternatively, the module including the transmitting circuit 110, the receiving circuit 120, the sampling circuit 130, the computing circuit 140, and the control circuit 150 may be referred to as a distance measuring module, which may be independent of the other modules.

Figure 5:
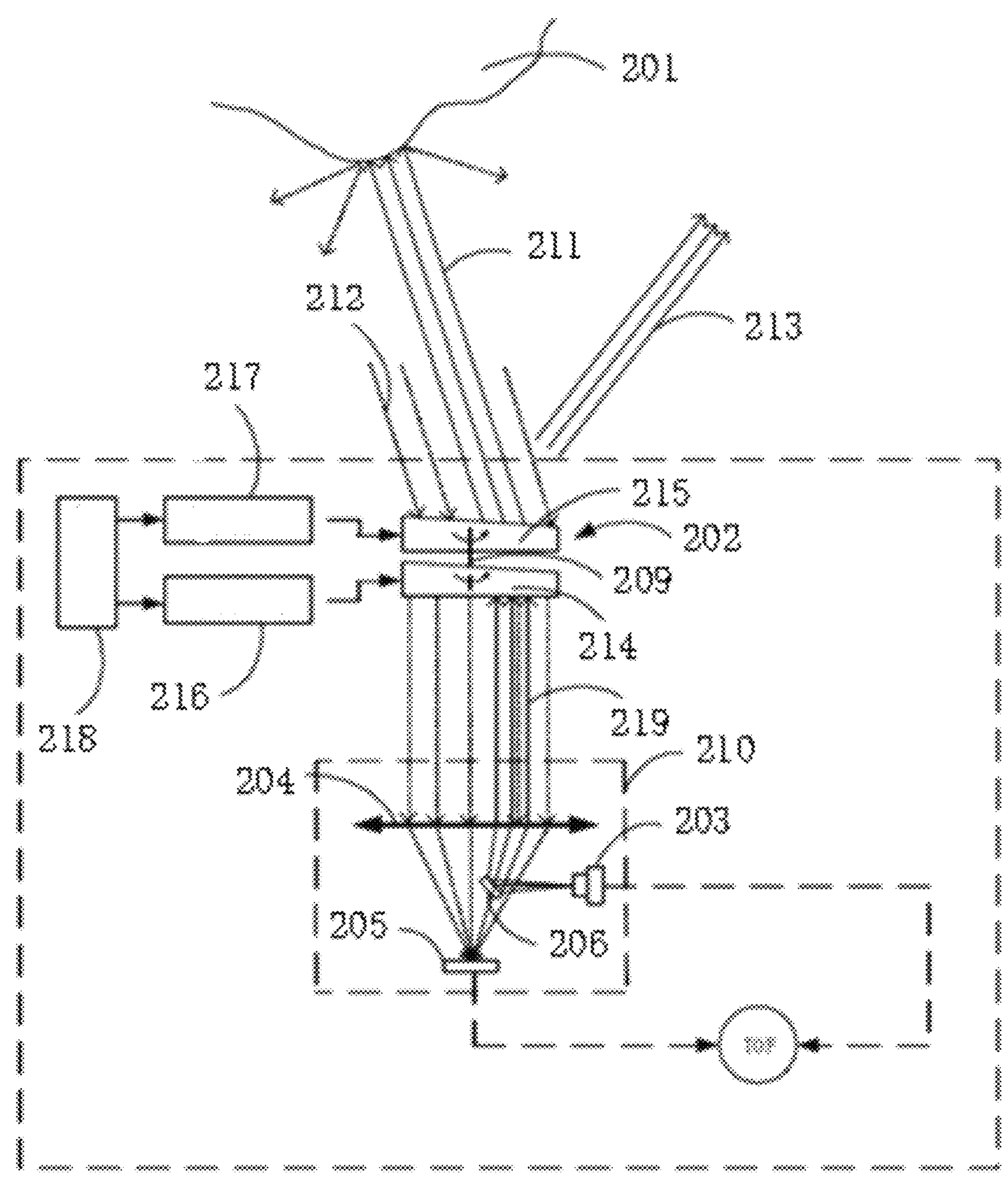
FIG. 5 shows a schematic diagram of a beam route of a distance measuring device provided in an embodiment of the present application.

A coaxial optical path may be used in the distance measuring device 100, i.e., the beam emitted by the distance measuring device 100 and the reflected beam share at least a portion of the optical path within the distance measuring device 100. For example, after the at least one laser pulse sequence emitted by the transmitting circuit 110 is emitted by the scanning module to change the propagation direction, the laser pulse sequence reflected back from the ambient target is incident to the receiving circuit 120 after passing through the scanning module. Alternatively, the distance measuring device 100 may adopt a hetero-axial optical path, i.e., the beam emitted by the distance measuring device 100 and the beam reflected back from it are transmitted separately along different optical paths within the distance measuring device 100. FIG. 5 illustrates a schematic diagram of the distance measuring device 100 of an embodiment of the present application employing a coaxial optical path.

In one embodiment, the distance measuring device 100 comprises a distance measuring module 210 (i.e., the distance measuring module described above), the distance measuring module 210 comprising a transmitter 203 (which may comprise the transmitting circuit 110 described above), a collimating element 204, a detector 205 (which may comprise the receiving circuit 120, the sampling circuit 130, and the computing circuit 140 described above), and an optical path altering element 206. The distance measuring module 210 is used to emit a light beam and receive the return light, converting the return light into an electrical signal. Among other things, the transmitter 203 may be used to transmit a sequence of light pulses. In one embodiment, the emitter 203 may emit a laser pulse sequence. Optionally, the laser beam emitted by the emitter 203 is a narrow bandwidth beam with a wavelength outside the visible range. A collimating element 204 is provided on the outgoing optical path of the emitter for collimating the beam emitted from the emitter 203, collimating the beam emitted from the emitter 203 into parallel light outgoing to the scanning module 202. The collimating element 204 is also used to converge at least a portion of the return light that is reflected by the ambient, target. The collimating element 204 may be a collimating lens or other element capable of collimating the light beam.

In the embodiment shown in MG, 5, the transmitting and receiving optical paths within the distance measuring device 100 are combined before the collimating element 204 by means of the optical path altering element 206, so that, the transmitting and receiving optical paths can share the same collimating element 204, resulting in a more compact optical path. In some other implementations, it is also possible that the transmitter 203 and the detector 205 each use their own collimating element 204, with the optical path altering element 206 provided on the optical path after the collimating element 204.

In one embodiment shown in FIG. 5, since the beam aperture of the outgoing light beam from the emitter 203 is small and the beam aperture of the return light received by the distance measuring device 100 is large, the optical path altering element 206 may employ a reflector with a small surface area to merge the emitting light path with the receiving light path. In some other implementations, the optical path altering element 206 may also employ a reflector with a through-hole, wherein the through-hole is used for transmitting the outgoing light from the transmitter 203 and the reflector is used for reflecting the return light to the detector 205. This reduces the amount of blocking of the return light by the holder of the small reflector in the case of employing a small reflector.

In the embodiment shown in FIG. 5, the light path alteting element 206 is offset from the optical axis of the collimating element 204. In some other implementations, the light path changing element 206 may also be located on the optical axis of the collimating element 204.

In one embodiment, the distance measuring device 100 further includes a scanning module 202. The scanning module 202 is placed on the outgoing optical path of the distance measuring module 210, and the scanning module 202 is used to change the direction of transmission of the collimated light beam 219 emitted through the collimating element 204 and projected to the external environment, and project the return light to the collimating element 204. the return light is converged to the detector 205 through the collimating element 204. In some implementations, the scanning module 202 may adopt a scanning module as described in Example 1, but the number of optics in the scanning module 202 and the outgoing light path may be adaptively adjusted as needed, for example, the optics in the scanning module 202 may be 2 or more, so as to adopt a layout such as that in Example 1 when 2 or more drivers are included, or, for example, in order to solve the problem that the problem of the alignment of the drivers obscuring the outgoing optical path, the optical elements in the scanning module may be capable of 360-degree outgoing.

In one embodiment, the scanning module 202 may include at least one optical element for changing the propagation path of the light beam, wherein the optical element may change the propagation path of the light beam by reflecting, refracting, diffracting, and the like on the light beam. For example, the scanning module 202 may include a lens, a prism, a grating, a liquid crystal, an Optical Phased Array (OPA), or any combination of the above optical elements. In one example, at least a portion of the optical element is in motion, such as by means of a drive module to drive the at least a portion of the optical element in motion, and the moving optical element may reflect, refract, or diffract the light beam in different directions at different moments. In some embodiments, the plurality of optical elements of the scanning module 202 may rotate or vibrate about a common axis of rotation 209, with each rotating or vibrating optical element used to continually change the direction of propagation of the incident beam. In one embodiment, the plurality of optical elements of the scanning module 202 may rotate at different speeds or vibrate at different speeds. In another embodiment, at least some of the optical elements of the scanning module 202 may rotate at substantially the same rotational speed. In some embodiments, the plurality of optical elements of the scanning module 202 may also be rotating about different axes. In some embodiments, the plurality of optical elements of the scanning module 202 may also be rotating in the same direction, or rotating in a different direction; or vibrating in the same direction, or vibrating in a different direction, without limitation herein.

In one embodiment, the scanning module 202 includes a first optical element 214 and a driver 216 coupled to the first optical element 214, the driver 216 is used to drive the first optical element 214 to rotate around the rotation axis 209, causing the first optical element 214 to change the direction of the collimated beam 219. The first optical element 214 projects the collimated beam 219 in a different direction. In one embodiment, the angle between the direction of the collimated beam 219 as changed by the first optical element and the rotation axis 209 varies with the rotation of the first optical element 214. In one embodiment, the first optical element 214 includes an opposing non-parallel pair of surfaces through which the collimated beam 219 passes. In one embodiment, the first optical element 214 includes a prism whose thickness varies in at least one radial direction. In one embodiment, the first optical element 214 includes a wedge angle prism that refracts the collimated beam 219.

In one embodiment, the scanning module 202 further comprises a second optical element 215; the second optical element 215 rotating around a rotation axis 209; the second optical element 215 rotating at a speed different from the rotation speed of the first optical element 214. The second optical element 215 is used to change the direction of the light beam projected by the first optical element 214. In one embodiment, the second optical element 215 is connected to another driver 217 which drives the second optical element 215 to rotate. The first optical element 214 and the second optical element 215 may be driven by the same or different drivers so that the first optical element 214 and the second optical element 215 rotate and/or steer differently, thereby projecting the collimated beam 219 in different directions in the outside space and allowing a larger spatial area to be scanned. In one embodiment, the controller 218 controls the drivers 216 and 217 to drive the first optics 214 and the second optics 215, respectively. The rotational speeds of the first optics 214 and the second optics 215 may be determined based on the area and style of scanning expected in the actual application. The drivers 216 and 217 may include motors or other drives.

In one embodiment, the second optical element 215 includes an opposing non-parallel pair of surfaces through which a light beam passes. In one embodiment, the second optical element 215 includes a prism whose thickness varies along at least one radial direction. In one embodiment, the second optical element 215 includes a wedge angle prism.

In one embodiment, the scanning module 202 further comprises a third optical element (not shown) and an actuator for driving movement of the third optical element. Optionally, the third optical element includes an opposing non-parallel pair of surfaces through which the light beam passes. In one embodiment, the third optical element comprises a prism whose thickness varies along at least one radial direction. In one embodiment, the third optical element comprises a wedge angle prism. At least two of the first, second, and third optical elements rotate at different speeds and/or steering.

Figure 6:
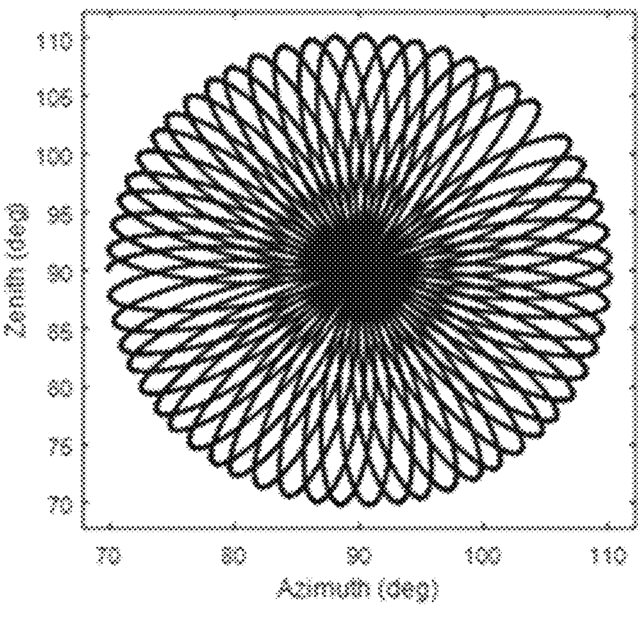
FIG. 6 shows a schematic diagram of a scanning pattern of a distance measuring device provided in an embodiment of the present application.

The rotation of each optical element in the scanning module 202 may project light in different directions, such as directions 211 and 213, and so scan the space around the distance measuring device 100. As shown in FIG. 6, FIG. 6 shows a schematic diagram of one scanning pattern of the distance measuring device 100 according to one embodiment of the present application. It will be appreciated that as the speed of the optical elements within the scanning module 202 varies, the scanning pattern also varies.

When the light projected by the scanning module 202 hits the ambient target 201 along the direction 211, a portion of the light is reflected by the ambient, target 201 to the distance measuring device 100 in a direction opposite to the direction 211 along which the projected light is directed. The return light 212 reflected by the ambient target 201 is incident on the collimating element 204 after passing through the scanning module 202.

In one embodiment, the detector 205 is placed on the same side of the collimating element 204 as the emitter 203, and the detector 205 is used to convert at least a portion of the return light passing through the collimating element 204 into an electrical signal.

In one embodiment, each optical element is coated with a transmissive enhancement film. Optionally, an thickness of the transmission-enhancing film is equal to or close to the wavelength of the beam emitted by the emitter 103, capable of increasing the intensity of the transmitted beam.

In one embodiment, an element of the distance measuring device 100 disposed on the beam propagation path has a filter layer coated on its surface, or a filter is provided on the beam propagation path for transmitting at least the band in which the beam emitted from the transmitter is located, and reflecting the other bands in order to minimize noise caused by the ambient light to the receiver.

In some embodiments, the transmitter 203 may include a laser diode through which a laser pulse sequence is emitted at the nanosecond level. Further, the laser pulse sequence reception time may be determined, e.g., by detecting a rising edge time and/or a falling edge time of the electrical signal pulse to determine the laser pulse sequence reception time. In this way, the distance measuring device 100 may utilize the pulse reception time information and the pulse emission time information to calculate the TOF, thereby determining a distance from the ambient target 201 to the distance measuring device 100.

The distance and direction detected by the distance measuring device 100 may be used for remote sensing, obstacle avoidance, mapping, modeling, navigation, and the like. In one embodiment, the distance measuring device 100 of an embodiment of the present application may be applied to a movable platform, and the distance measuring device 100 may be mounted on a movable platform body of the movable platform. The movable platform having the range-finding device 100 may perform measurements of the external environment, such as, for example, measuring a distance between the movable platform and an obstacle for purposes such as obstacle avoidance, and two- or three-dimensional mapping of the external environment. In some implementations, the movable platform includes at least one of an unmanned aerial vehicle, an automobile, a remotely operated vehicle, a robot, or a camera.

Example 3

Some embodiments of the present application also provide a movable platform comprising: a movable platform body, and a distance measuring device described in Example 2, the distance measuring device being mounted on the movable platform body.

A movable platform having a distance measuring device can measure the external environment, for example, measuring the distance between the movable platform and an obstacle for obstacle avoidance, mapping the external environment in two or three dimensions, and other uses.

In some embodiments of the present application, the movable platform includes at least one of an unmanned aerial vehicle, a car, a remotely controlled vehicle, a robot, and a camera. When the distance measuring device is applied to an unmanned aerial vehicle, the movable platform body is a body of the unmanned aerial vehicle, and of course, the distance measuring device may be located in an arm, a tripod, or the like of the unmanned aerial vehicle. When the distance measuring device is applied to an automobile, the movable platform body is the body of the automobile. The automobile may be an autopilot automobile or a semi-autopilot automobile, and is not limited herein. When the distance measuring device is applied to a remotely controlled vehicle, the movable platform body is the body of the remote control vehicle. When the distance measuring device is applied to a robot, the movable platform body is a robot. When the distance measuring device is applied to a camera, the movable platform body is the camera itself.

The technical solution provided by some embodiments of the present application, compared to the traditional solution, sets both the first drive assembly and the second drive assembly on one side of the main body holder, so that the cable routing of the first drive assembly and the second drive assembly does not need to pass through the light-through path of the second optical assembly, and thus does not block the light-through path of the second optical assembly, reducing the working blind zone of the scanning module, thus realizing the full-angle scanning area.

Finally, it should be noted that the above embodiments are only used to illustrate the technical solutions of the present application, not to limit them; although the present application has been described in detail with reference to the foregoing embodiments, a person of ordinary skill in the art should understand that he or she can still make modifications to the technical solutions as recorded in the foregoing embodiments, or make equivalent substitutions of some of the technical features therein; and such modifications or substitutions do not make the corresponding technical solutions depart from the spirit of the scope of the technical solutions of the various embodiments of the present application. These modifications or substitutions do not detach the essence of the technical solutions from the spirit and scope of the technical solutions of the embodiments of the present application.

What is claimed is:

1. A scanning module for a distance measuring device, comprising: a main body holder defining an accommodation cavity; a first optical assembly within the accommodation cavity and attached to the main body holder; a first drive assembly connected to the first optical assembly to drive the first optical assembly to move relative to the main body holder; a second optical assembly disposed at one end of the main body holder; and a second drive assembly on a side of the second optical assembly adjacent to the main body holder and connected to the second optical assembly to drive the second optical assembly to move relative to the main body holder, wherein the second optical assembly and the first optical assembly defines a light transmission channel, and at least one of the first drive assembly or the second drive assembly is disposed outside the light transmission channel.

2. The scanning module according to claim 1, wherein both the first drive assembly and the second drive assembly are disposed on the side of the second optical assembly adjacent to the main body holder.

3. The scanning module according to claim 1, wherein the first drive assembly comprises a first induction coil and a first induction magnet; one of the first induction coil or the first induction magnet is connected to the main body holder; and another one of the first induction coil or the first induction magnet is connected to the first optical assembly.

4. The scanning module according to claim 3, wherein the first induction coil is concentrically disposed with the first induction magnet and the first induction coil and the first induction magnet are distributed along a radial direction of the accommodation cavity; or the first induction coil and the first induction magnet are distributed along an axial direction of the accommodation cavity.

5. The scanning module according to claim 1, wherein the first optical assembly comprises a first optical element and an adapter, the adapter defining a light transmission channel; the first optical element is fixedly disposed within the light-transmitting channel; and the adapter is connected to the first drive assembly and the main body holder, respectively.

6. The scanning module according to claim 5, wherein the adapter is provided with at least one first bearing structure overlying a periphery of the adapter, and the adapter is rotatably connected to the main body holder via the first bearing structure.

7. The scanning module according to claim 5, wherein the first optical assembly comprises a plurality of the first optical elements, the plurality of the first optical elements being spaced apart along an axial direction of the accommodation cavity.

8. The scanning module according to claim 5, wherein the first optical element comprises a prism for refracting light.

9. The scanning module according to claim 1, wherein the second optical assembly is rotatably suspended from one end of the main body holder; or the second optical assembly is provided with a second bearing structure at one end of the second optical assembly adjacent to the main body holder, and the second optical assembly is rotatably connected to the first optical assembly or the main body holder via the second bearing structure.

10. The scanning module according to claim 9, further comprising a housing, the main body holder and the second optical assembly being located within the housing; and the second optical assembly is provided with at least one third bearing structure at one end of the second optical assembly away from the main body holder, the second optical assembly being rotatably provided on the housing via the third bearing structure.

11. The scanning module according to claim 1, wherein the second optical assembly is provided with a connecting bracket at one end of the second optical assembly adjacent to the main body holder; and the second drive assembly comprises a second induction coil and a second inductive magnet, one of the second induction coil or the second inductive magnet being connected to the main body holder and another one of the second induction coil or the second inductive magnet being connected to the connecting bracket.

12. The scanning module according to claim 11, wherein along the radial direction of the accommodation cavity, the second induction coil and the second induction magnet are both annularly disposed around a periphery of the first drive assembly; or along the axial direction of the accommodation cavity, the first drive assembly is spaced apart from the second drive assembly.

13. The scanning module according to claim 11, wherein the second induction coil is disposed concentrically with the second induction magnet and the second induction coil and the second induction magnet are distributed along a radial direction of accommodation cavity; or the second induction coil and the second induction magnet are distributed along an axial direction of accommodation cavity.

14. The scanning module according to claim 11, wherein the connecting bracket is provided with a connecting folded edge on a circumferential periphery, the connecting folded edge extending in an axial direction of the accommodation cavity or a radial direction of the accommodation cavity; and one of the second induction coil or the second induction magnet is connected to the connecting folded edge.

15. The scanning module according to claim 14, wherein the connecting folded edge is located outside the accommodation cavity and encloses an outer side of the main body holder; or the connecting folded edge is located inside the accommodation cavity.

16. The scanning module according to claim 1, wherein the second optical assembly comprises a second optical element and a counterweight; the counterweight has a connecting surface; and the second optical element is fixedly disposed on the connecting surface and corresponds in position to the first optical assembly.

17. The scanning module according to claim 16, wherein the second optical element comprises a prism for reflecting light.

18. A scanning module for a distance measuring device, comprising: a main body holder defining an accommodation cavity; a first optical assembly within the accommodation cavity and attached to the main body holder; a first drive assembly connected to the first optical assembly to drive the first optical assembly to move relative to the main body holder; a second optical assembly disposed at one end of the main body holder; a second drive assembly connected to the second optical assembly to drive the second optical assembly to move relative to the main body holder; and wherein the second optical assembly and the first optical assembly define a light transmission channel, and at least one of the first drive assembly or the second drive assembly is disposed outside the light transmission channel.

19. The scanning module according to claim 18, wherein both the first drive assembly and the second drive assembly are disposed on the side of the second optical assembly adjacent to the main body holder.

* * * * *